United States Patent
Araujo

(10) Patent No.: US 11,885,378 B2
(45) Date of Patent: Jan. 30, 2024

(54) CYLINDER UNIT FOR ELIMINATING SECONDARY FORCES IN INLINE INTERNAL COMBUSTION ENGINES

(71) Applicant: ALFADAN, INC., Miramar, FL (US)

(72) Inventor: Alberto Francisco Araujo, Miramar, FL (US)

(*) Notice: Subject to any disclaimer, the term of this patent is extended or adjusted under 35 U.S.C. 154(b) by 0 days.

(21) Appl. No.: 17/831,999

(22) Filed: Jun. 3, 2022

(65) Prior Publication Data

US 2022/0389953 A1 Dec. 8, 2022

Related U.S. Application Data

(60) Provisional application No. 63/197,103, filed on Jun. 4, 2021.

(51) Int. Cl.

| | | |
|---|---|---|
| F16C 7/02 | (2006.01) | |
| F16J 1/10 | (2006.01) | |
| F16J 7/00 | (2006.01) | |
| F16C 29/02 | (2006.01) | |
| F16J 1/12 | (2006.01) | |
| F02B 75/18 | (2006.01) | |
| F02B 75/20 | (2006.01) | |

(52) U.S. Cl.
CPC .......... *F16C 7/023* (2013.01); *F16J 1/12* (2013.01); *F16J 7/00* (2013.01); *F02B 75/20* (2013.01); *F02B 2075/1816* (2013.01); *F16C 29/02* (2013.01); *F16C 2360/22* (2013.01)

(58) Field of Classification Search
CPC .. F01B 9/02; F01B 9/023; F01B 9/026; F02B 75/20; F02B 2075/1816; F16C 7/02; F16C 7/023; F16C 2360/22; F16C 29/02; F16J 1/10; F16J 7/00; F16J 1/12
See application file for complete search history.

(56) References Cited

U.S. PATENT DOCUMENTS

| | | | |
|---|---|---|---|
| 4,827,896 A | 5/1989 | Adams | |
| 4,974,554 A * | 12/1990 | Emery | ............ F16H 21/32 123/48 B |
| 5,131,353 A | 7/1992 | Bauer et al. | |
| 6,223,711 B1 | 5/2001 | Pelz | |

(Continued)

FOREIGN PATENT DOCUMENTS

| | | | | |
|---|---|---|---|---|
| DE | 738713 C | * | 9/1943 | |
| DE | 102004000027 A1 | * | 3/2006 | ............ F01B 9/023 |

(Continued)

OTHER PUBLICATIONS

International Search Report and Written Opinion from the International Searching Authority at the United States Patent and Trademark Office, Authorized Officer Kari Rodriguez, dated Sep. 9, 2022, pp. 1-10.

*Primary Examiner* — Adam D Rogers

(57) ABSTRACT

A cylinder unit includes a piston disposed in the cylinder bore that is connected to a piston connecting frame member. The piston connecting frame member replaces a conventional connecting rod, and reciprocates exclusively along the bore axis. A crank connecting member has a linear rail at its top that is captured in a transverse gap along the bottom of the piston connecting frame member, and converts the circular movement of a crank throw to linear motion of the piston connecting frame member.

13 Claims, 16 Drawing Sheets

(56) References Cited

U.S. PATENT DOCUMENTS

| | | | | |
|---|---|---|---|---|
| 7,152,556 | B2* | 12/2006 | Goltsman | F02B 75/32 74/44 |
| 10,378,578 | B1* | 8/2019 | Araujo | F02B 75/32 |
| 11,098,750 | B2* | 8/2021 | Araujo | F02B 75/32 |
| 2013/0098335 | A1 | 4/2013 | Diggs | |
| 2020/0400066 | A1* | 12/2020 | Brizuela Fernandez | F02B 41/04 |

FOREIGN PATENT DOCUMENTS

| | | | | |
|---|---|---|---|---|
| FR | 2452589 A1 | * | 10/1980 | |
| FR | 2981698 A1 | * | 4/2013 | F01B 9/02 |

\* cited by examiner

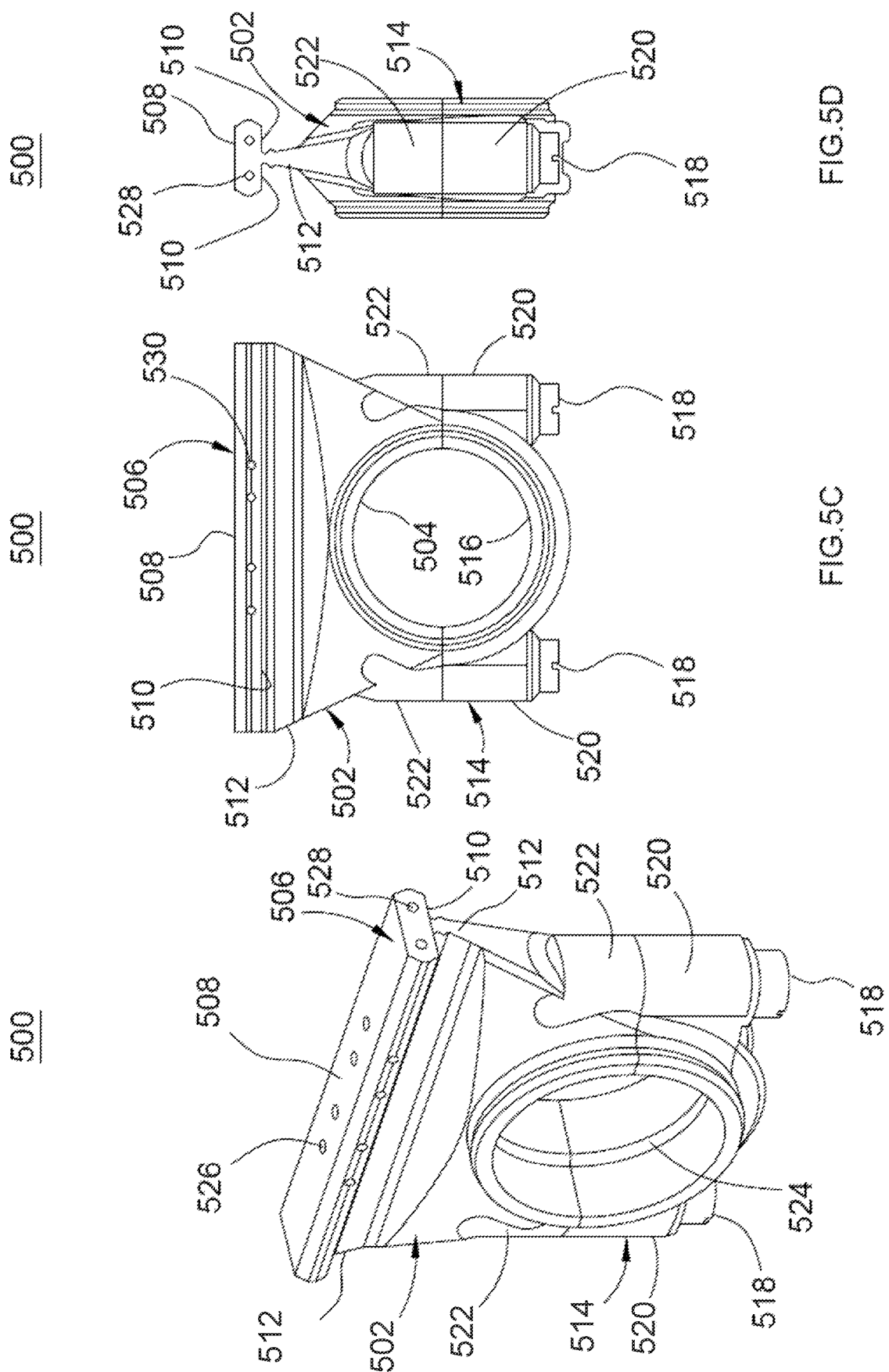

CYLINDER UNIT FOR ELIMINATING SECONDARY FORCES IN INLINE INTERNAL COMBUSTION ENGINES

CROSS REFERENCE

This application claims priority to provisional application No. 63/197,103, filed Jun. 4, 2021, the entirety of which is hereby incorporated by reference.

FIELD OF THE INVENTION

The present invention relates generally to internal combustion engines, and, more particularly, relates to an internal combustion engine that uses piston connectors that only move linearly, and which are attached to a crank connector that attaches to a crank journal and the piston connector, and which reciprocates linearly on the piston connector while revolving with the crank journal.

BACKGROUND OF THE INVENTION

In many conventional internal combustion engines, the pistons are connected to a crankshaft through a connecting rod. The connecting rod pivots about a point where it is attached to the piston at the top of the connecting rod, which moves mostly vertically with piston. The lower end of the connecting rod, however, reciprocates circularly with the crankshaft connecting rod journal. This conventional arrangement is used in may common engines.

One of the most common engines in automotive applications is the inline four cylinder engine. The inline four cylinder engine has been around and in production since the early 1900's but has suffered from various inherent design flaws which have limited the maximum displacement of the engine design to around 2.5 liters. The conventional inline four-cylinder configuration has very little rocking which typically results in smooth middle RPM range. However, these engines are known to produce what are referred to as secondary forces, resulting in imbalance, which is undesirable for high RPMs. This secondary imbalance is largely caused by the fact that the pistons move together in pairs, offset in timing by 180 degrees. The two pistons moving upward toward top dead center travel a greater distance from the mid stroke position than the two pistons moving downward from the mid stroke position toward bottom dead center. This difference in travel over the same amount of time leads to different accelerations which results in the secondary imbalance and creates two upward, and out of balance, pulses per revolution of the crankshaft. Rotational vibration on the crankshaft axis tend to be large because, in addition to the non-overlapping power stroke inherent in engines with four or fewer cylinders, the height imbalance from the connecting rods' center of gravity swinging side to side relative to the crankshaft axis is amplified due to there being two connecting rods moving together.

For conventional inline four cylinder engines there are three types of crankshaft designs that attempt to mitigate or dampen these undesirable forces. These conventional designs include crankshafts with no counter weights, crankshafts that are fully counter-weighted, and crankshafts that are semi-counter or half-counter weighted. Crankshafts without counter weights were used on engines up to the mid-1930s for automobiles, but are still to be found in agricultural use (with the known imbalance problems). With counter weight an inline four cylinder engine crank is balanced for primary forces, primary and secondary couples, but not for secondary forces. Secondary forces cannot be balanced on the crankshaft, and are addressed by using two contra-rotating balance shafts running at twice the engine speed. These balance shafts are typically only provided on premium quality cars that demand very smooth running, or on large engines in excess of about 2.4 L where the level of secondary vibration becomes obtrusive. The primary couples bend the crank to an S shape with the deflection increasing with rpm. Without counter weights this deflection causes failures when the deflection exceeds the material strength or bearing clearance, resulting in rubs (i.e. breaches of the lubricant layer). These failures have resulted in a public perception that high RPM operation is bad for the inline four cylinder engine that lingers to this day. This has been addressed in some crankshafts which have two counter weights on each crank throw while other crankshafts have one counter weight on each crank throw, which are on each end of the crankshaft and on both sides of the center. The counterweights balance each other completely for primary forces and couples and have no secondary forces/couple. Many prior art engine designs have been created in an attempt to overcome the secondary imbalance forces but all are merely a solution which allows the engine vibration to not be felt by the operator while the forces are still experienced in the engine. These forces drive component sizes higher and bearings larger, resulting in more size, mass and frictional losses.

Thus, the four cylinder inline engine design suffers from two major inherent design flaws, one being the fact that connecting rods swing in pairs from side to side and the second is the pair of pistons traveling at different speeds causing the secondary imbalance problem. Both of these conditions cause severe loads on the crankshaft and crankshaft bearings, which can result in engine failure, or force the manufacturer to use larger, heavier components.

Therefore, a need exists to overcome the problems with the prior art as discussed above.

SUMMARY OF THE DISCLOSURE

In accordance with some embodiments of the inventive disclosure, there is provided an internal combustion engine that includes a plurality of in-line cylinder units. Each one of the cylinder units having a bore having a bore axis and a piston disposed in the bore that reciprocates within the bore along the bore axis. The piston has a head, and a connecting boss extending from a bottom of the head. There is further included a piston connecting frame member having a top boss that is centrally located on the piston connecting frame member and that is coupled to the connecting boss of the piston. The piston connecting frame member further has a pair of lateral portions extending outward in opposing direction. Each lateral portion has a vertical end face with a respective vertical linear bearing mounted on the vertical end face. The piston connecting frame member further has a bottom on which a bottom linear bearing is mounted. The cylinder units each further include a crank connecting member that has a lateral rail at a top of the crank connecting member. The lateral rail is captured at a bottom of the piston connecting frame member and reciprocates laterally along the bottom of the piston connecting frame member. The crank connecting member further has a crank throw opening to connect to a throw of a crankshaft.

In accordance with a further feature, the piston of each cylinder unit is a skirtless piston.

In accordance with a further feature, the piston connecting frame member includes a pair of vertical side extension, each one of the vertical side extensions mounted on a respective one of opposing sides of the piston connecting frame member, and having a lower portion that extends inward, under the bottom linear bearing, and wherein the lower portion of each vertical side extension include a linear bearing under the bottom linear bearing on the bottom of the piston connecting frame member, wherein the lateral rail of the crank connecting member is captured between the bottom linear bearing and the linear bearings on each of the vertical side extensions.

In accordance with a further feature, the crank connecting member includes an oil groove formed in a crank journal, and further includes at least one oil passage to the lateral rail, and wherein the at least one oil passage to the lateral rail is open at the lateral rail.

In accordance with a further feature, the lateral rail comprises oil passages that are open at a top, sides, and ends of the lateral rail.

In accordance with a further feature, the connecting boss of the piston includes a threaded bore, the top boss of the piston connecting frame member includes a bore that corresponds to the bore in the connecting boss, the piston connecting frame member further having a port through the piston connecting frame member to which the bore in the top boss extends, a threaded rod is disposed in the bore of the connecting boss the bore through the top boss such that free end of the threaded rod is in the port, and a nut is threaded onto the free end to retain the piston to the piston connecting frame member.

In accordance with a further feature, the engine further incudes an anti-rotation pin that extends from the top boss into a bottom of the connecting boss that prevents the piston from rotating with respect to the piston connecting frame member.

In accordance with some embodiments of the inventive disclosure, there is provided an inline four-cylinder engine that includes four piston assemblies arranged in a line, and each of the four piston assemblies being connected to a crankshaft. Each one of the piston assemblies includes a piston that has a head and a connecting boss extending from a bottom of the head. There is further included a piston connecting frame member having a top boss that is centrally located on the piston connecting frame member and that is coupled to the connecting boss of the piston. The piston connecting frame member further has a pair of lateral portions extending outward in opposing directions. Each lateral portion has a vertical end face with a respective vertical linear bearing mounted on the vertical end face. The piston connecting frame member further has a bottom on which a bottom linear bearing is mounted. There is further included a crank connecting member that has a lateral rail at a top of the crank connecting member, and a journal opening configured to receive a crank throw therein. The lateral rail is captured at a bottom of the piston connecting frame member and reciprocates laterally along the bottom of the piston connecting frame member. The crank connecting member further has a crank throw opening to connect to a throw of the crankshaft.

In accordance with a further feature, the piston of each cylinder unit is a skirtless piston.

In accordance with a further feature, the piston connecting frame member includes a pair of vertical side extension, each one of the vertical side extensions mounted on a respective one of opposing sides of the piston connecting frame member, and having a lower portion that extends inward, under the bottom linear bearing, and wherein the lower portion of each vertical side extension include a linear bearing under the bottom linear bearing on the bottom of the piston connecting frame member, wherein the lateral rail of the crank connecting member is captured between the bottom linear bearing and the linear bearings on each of the vertical side extensions.

In accordance with a further feature, the crank connecting member includes an oil groove formed in a crank journal, and further includes at least one oil passage to the lateral rail, and wherein the at least one oil passage to the lateral rail is open at the lateral rail.

In accordance with a further feature, the lateral rail comprises oil passages that are open at a top, sides, and ends of the lateral rail.

In accordance with a further feature, the connecting boss of the piston includes a threaded bore, the top boss of the piston connecting frame member includes a bore that corresponds to the bore in the connecting boss, the piston connecting frame member further having a port through the piston connecting frame member to which the bore in the top boss extends, a threaded rod is disposed in the bore of the connecting boss the bore through the top boss such that free end of the threaded rod is in the port, and a nut is threaded onto the free end to retain the piston to the piston connecting frame member.

In accordance with a further feature, there is further included an anti-rotation pin that extends from the top boss into a bottom of the connecting boss that prevents the piston from rotating with respect to the piston connecting frame member.

In accordance with some embodiments of the inventive disclosure, there is provided a cylinder unit for an internal combustion engine that includes a cylinder having a bore, wherein the bore has a bore axis. The cylinder unit also has a piston disposed in the bore, and a piston connecting frame member connected to the piston. The piston connecting frame member has lateral portions extending in opposite directions generally in a direction normal to the bore axis, each of the lateral portions having a vertical linear bearing that each face outward from the respective lateral portions and are each oriented to have an outer face that is parallel to the bore axis. There is a transverse gap formed at a bottom of the piston connecting frame member. The cylinder unit further includes a crankcase having vertical tracks on opposite sides of an interior of the crankcase. The vertical linear bearings are each engaged in one of the vertical tracks. The cylinder unit includes a crank connecting member has a top portion, and a linear lateral rail formed at the top portion that is captured in the transverse gap. The crank connecting member further has a journal opening configured to receive a crank throw therein. The crank connecting member translates a circular movement of the crank throw to a vertical linear movement of the piston connecting frame member and piston along the bore axis.

Although the invention is illustrated and described herein as embodied in a cylinder unit for eliminating secondary forces in an inline internal combustion engine, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the structure being discussed. The terms "vertical," "top," "bottom" generally are referenced to the direction of piston travel in their respective cylinders. In other words, a piston reciprocates in a "vertical" direction in its cylinder, although the cylinder may be oriented horizontally relative to some external reference. The term "horizontal," in the context of describing something inside a cylinder unit, refers to a direction that is anti-parallel to the "vertical" direction of the piston. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 5A-5D show views of a crank connecting member, in accordance with some embodiments;

DETAILED DESCRIPTION

Figures 1A, 1B, 1C:
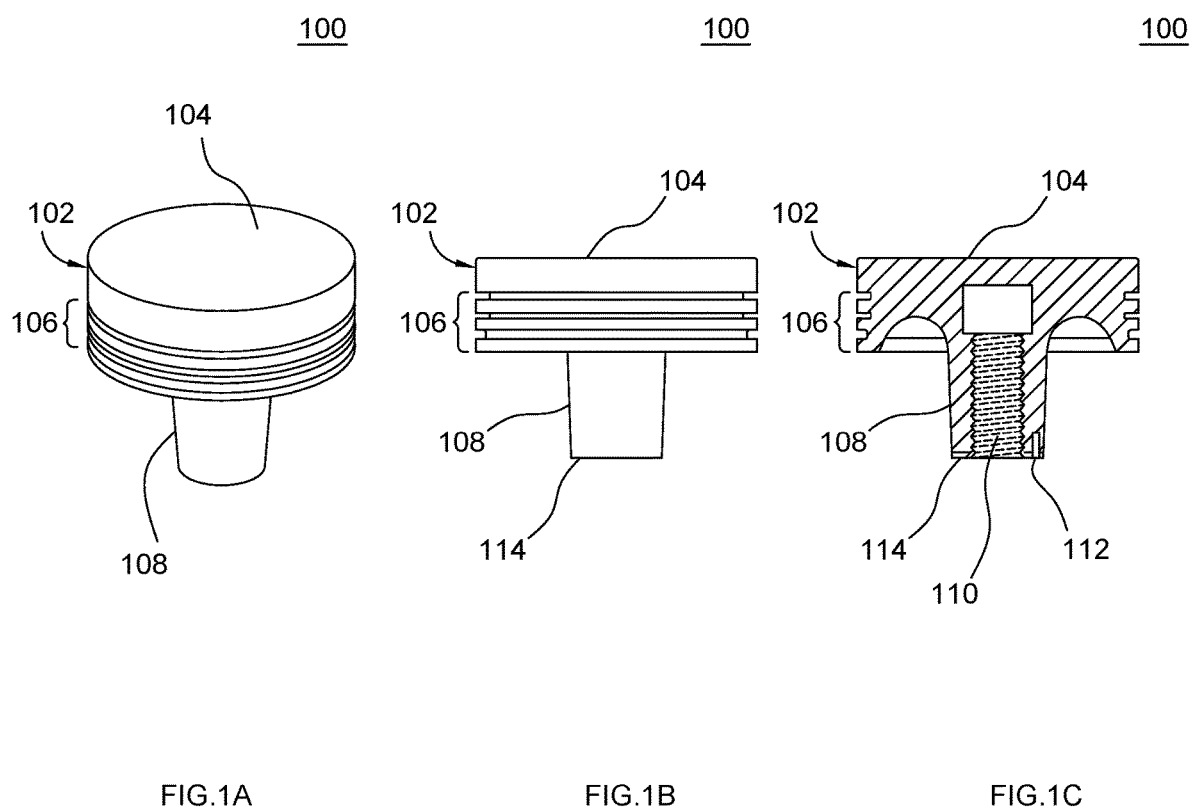
FIGS. 1A-1C show various views of a piston for an internal combustion engine, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

A cylinder unit and an inline engine using the disclosed cylinder unit uses a connecting rod assembly that moves vertically, or along the axis of movement of the piston, exclusively. That is, no portion of the connecting rod assembly moves in a direction other than vertically. As a result, the connecting rod does not swing with the crank. Instead, a crank connecting member is connected to the bottom of the connecting rod assembly and reciprocates laterally and vertically with the crank throw. The crank connecting member slides along a rail on the bottom of the connecting rod frame. As a result, the connecting rod moves at a uniform speed, vertically, through its cycle, for a given cycle rate, and avoids the creation of secondary forces that are created by conventional connecting rods due to following the crank throw.

FIGS. 1A-1C show various views of a piston 100 for an internal combustion engine, in accordance with some embodiments. FIG. 1A shows a top and side perspective view of the piston 100, FIG. 1B shows a side elevational view of the piston 100, and FIG. 1C shows a side cut-away view of the piston 100 where the piston 100 has been cut vertically through the center of the piston 100. The piston 100 uses an unconventional configuration that is facilitated by the structures connecting the piston 100 to the crankshaft. In many conventional internal combustion engines, the piston has a skirt, and a wrist pin that connect to a connecting rod which is also connected to a throw (crank throw) on a crankshaft. That conventional arrangement is what produces the well-known secondary forces in inline engines, particularly inline four-cylinder (I4) engines. The piston 100 includes a head 102 having a crown 104 or top. A plurality of ring grooves 106 are formed in the side of the head 102. The grooves 106 can include oil and compression ring groove and receive oil and compression rings accordingly. A connecting boss 108 extends downward from the bottom of the head 102. The connecting boss 108 is generally a columnar structure that is centrally located, and includes a bore 110 along the axis of the connecting boss 108 that is open at the bottom 114 of the connecting boss 108. The bore 110 can be threaded to receive a threaded connecting member. In some embodiments a hole 112 is formed in the bottom 114 adjacent the opening of the bore 110 to receive an anti-rotation pin that prevents the piston 100 from rotating once assembled to the connecting member as the pin will seat in both the piston in hole 112 and in a corresponding hole in the connecting member.

In general, the bottom 114 of the connecting boss 108 is flat along a plane that is parallel to the plane of the crown 104. The underside of the head 102 can be recessed to lighten the piston 100. The recesses can be formed between the side of the piston the connecting boss 108, having, for example, a toroidal shape around the connecting boss 108. In general, the piston 100 lacks a skirt portion, which on conventional pistons extends substantially below the ring groves 106 to reduce a tendency of the piston to turn in the cylinder bore due to the horizontal force component created by the connecting rods. However, in the inventive piston assembly and engine, only a vertical force component acts on the pistons, thus there is no need for a conventional skirt, which allow for the pistons to have lower mass over that of conventional engines. In some embodiments the piston can have a minimal skirt in order to add support when the bore of the cylinder is not vertical so as to cause the piston to rest on the cylinder wall. A small skirt portion can then add support for the weight of the piston and provide enough surface area to create the necessary oil film barrier needed to support the piston weight. In some embodiments, the minimal skirt can extend about one half inch below the ring groove section 106, but overall, the larger skirt needed for pistons using conventional connecting rods is not necessary using the inventive cylinder unit arrangement.

Figure 2A:
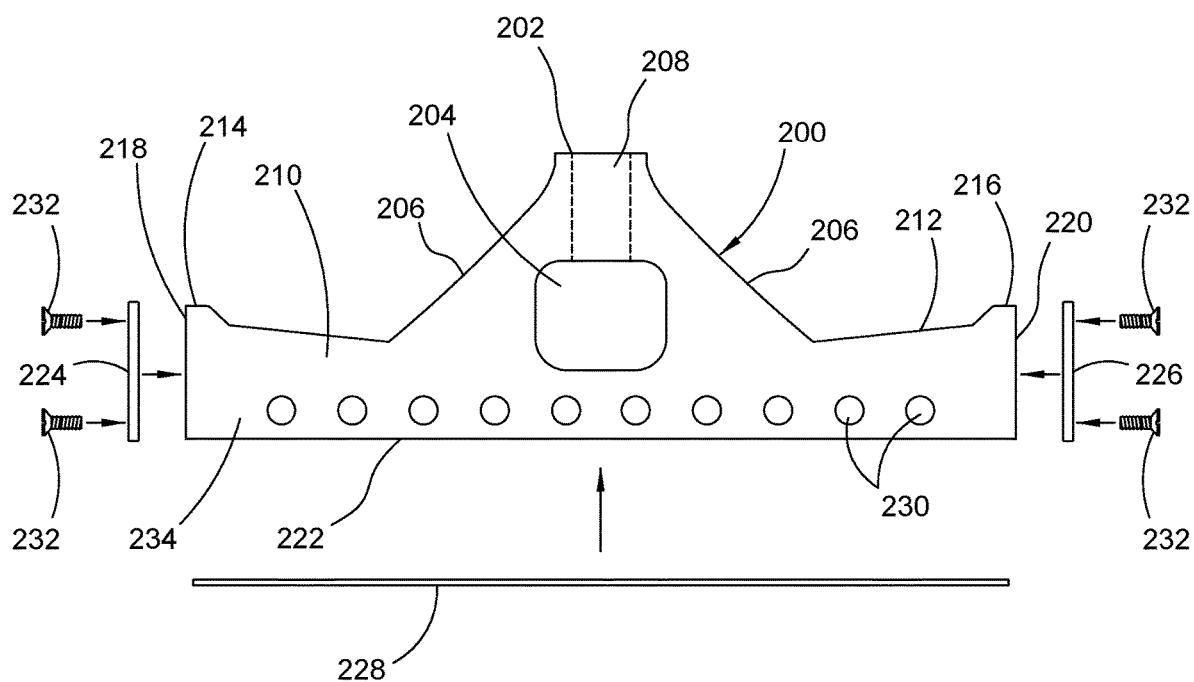
FIGS. 2A-2B show a piston connecting frame member in an assembly series, in accordance with some embodiments.
Figure 2B:
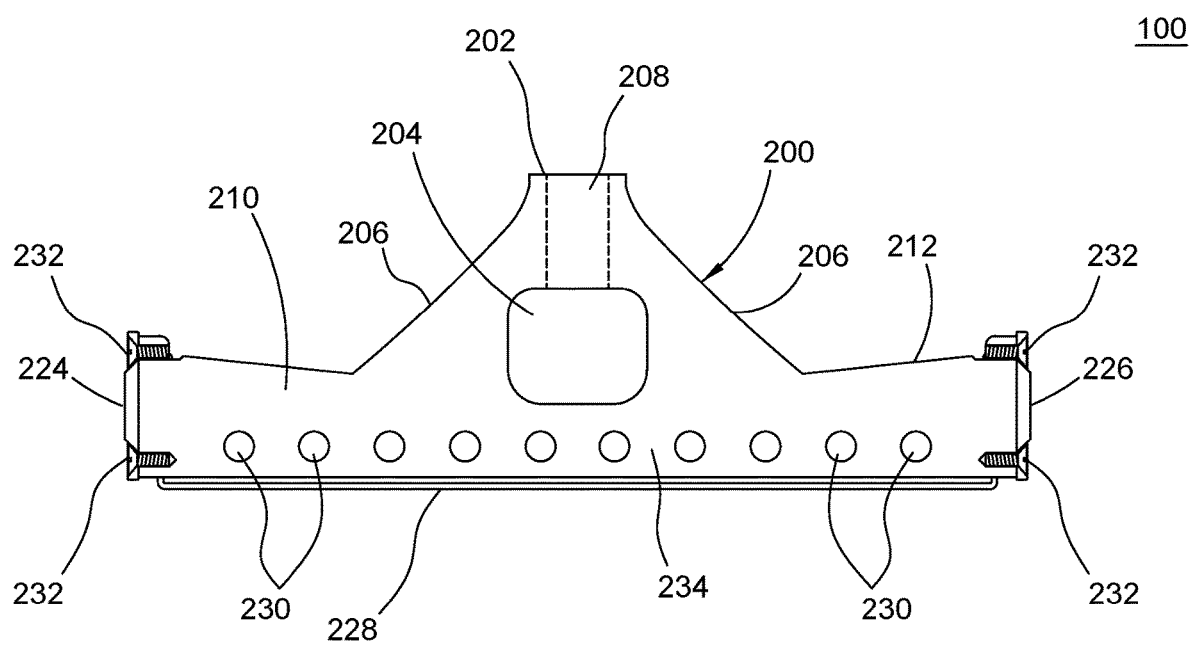

FIGS. 2A-2B show a piston connecting frame member 200 in an assembly series, in accordance with some embodiments. The piston connecting frame member 200 is shown in FIG. 2A in an unassembled state, and in FIG. 2B in a partially assembled state, where linear bearing elements are attached to the piston connecting frame member 200. The piston connecting frame member 200 connects to the piston 100 at a centrally located top boss 202, at the top surface of the top boss 202. The top boss 202 is sized and shaped to mate with connecting boss 108 of the piston 100 at the bottom 114 of the connecting boss 108. A bore 208 passes through the center of the top boss 202 and aligns with the bore 110 in the connecting boss 108 of the piston 100. While the top boss 202 is generally cylindrical at its uppermost portion (i.e., where it meets the bottom 114 of the connecting boss 108), the piston connecting frame member 200 transitions from the cylindrical shape at the top boss 202 to a generally planar shape toward the bottom 222 of the piston connecting frame member 200. Side portions 206 extend outward from the top boss 202 to opposite sides at about a forty-five-degree angle to lateral portions 210, 212 on opposing sides of the top boss 202, which also extend laterally from the central region of the piston connecting frame member 200. In general, lateral portion 210, 212 extend laterally on opposite sides of the axis of the bore 208 such that between vertical end faces 218, 220 there is a straight line through the axis of the bore 208.

A port 204 passes through the middle of the piston connecting frame member 200 under the bore 208, and the bottom of the bore 208 opens to the port 204. The lateral portions 210, 212 extend outward, to the sides, and have vertical end faces 218, 220, respectively. The end faces 218, 220 provide surfaces on which vertical linear bearings 224, 226 are mounted, and which can be held in place by bolts 232 that thread into support portions such as 214, 216. The vertical linear bearings 224, 226 each face outward and have a face that is oriented parallel to the axis of the bore. Each of the vertical bearings 224, 226 slide along respective vertical tracks in the crankcase wall of the engine that are parallel to the axis of the bore, ensuring that the movement of the piston connecting frame member 200 is strictly vertical (up/down), meaning in a direction along the cylinder bore axis. As a result, the vertical linear bearing 224, 226 also move or reciprocate in a direction parallel to the axis of the cylinder bore. Along the bottom portion of the piston connecting frame member 200 are a plurality of holes 230 that pass through the piston connecting frame member 200 from side to side, in a horizontal direction perpendicular to the direction from one end face 218 to the opposite end face 220, as with port 204. The holes 230 are used to connect extension members to the sides of the piston connecting frame member 200. A horizontal linear bearing 228 is attached to the flat bottom 222 of the piston connecting frame member 200.

Figure 3:
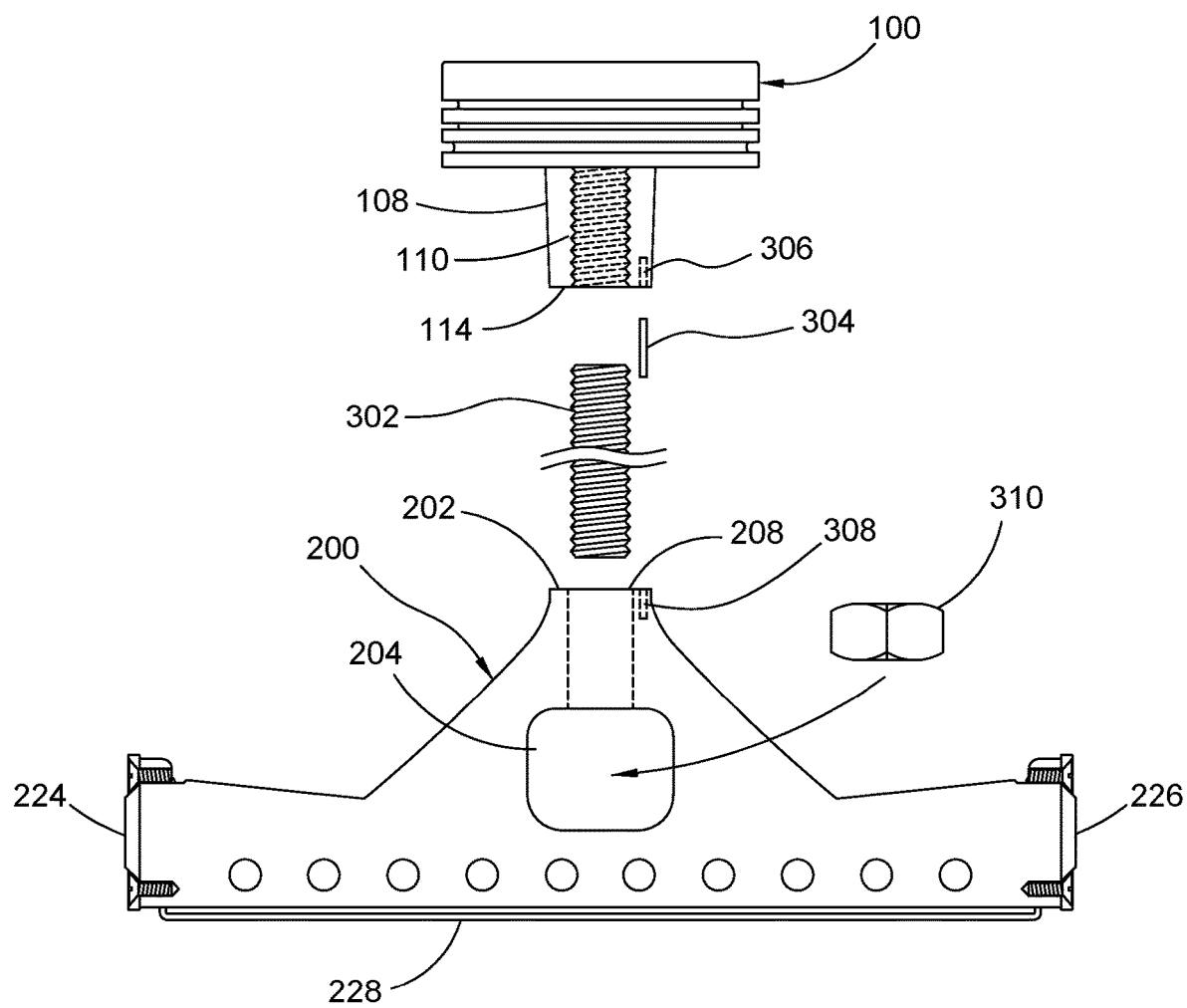
FIG. 3 shows an exploded view or a piston sub-assembly, in accordance with some embodiments.

FIG. 3 shows an exploded view of a piston sub-assembly 300, in accordance with some embodiments. The piston 100 is shown as it would be assembled to an assembled piston connecting frame member 200. The piston 100 is as shown in FIGS. 1A-1C and the piston connecting frame member 200 is as shown in FIG. 2B. A threaded rod 302 is placed into the bore 110 in the connecting boss 108 of the piston 100. The bore 110 can be threaded to receive the threaded rod 302. A portion of the threaded rod 302 will extend through the bore 208 in the top boss 202, and into the port 204, where fastening nut 310 is placed on the lower end of the threaded rod 302 to hold the piston 100 to the piston connecting frame member 200. To prevent the piston 100 from rotating, an anti-rotation pin 304 can be placed such that an upper end of the pin 304 is in a vertical alignment bore 306 in the bottom 114 of the connecting boss 108 of the piston, and the lower end of the pin 304 can be in a corresponding alignment bore 308 in the top of the top boss 202 of the piston connecting frame member 200. The pin 304 prevents the piston 100 from rotating and loosening the connection between the piston 100 and the piston connecting frame member 200.

Other structures for connecting the piston 100 to the piston connecting frame member 200 can be used equivalently. For example, the port 204 can extend through the bottom of the piston connecting frame member 200 to allow a bolt to be inserted into the bores 208, 110.

Figure 4A:
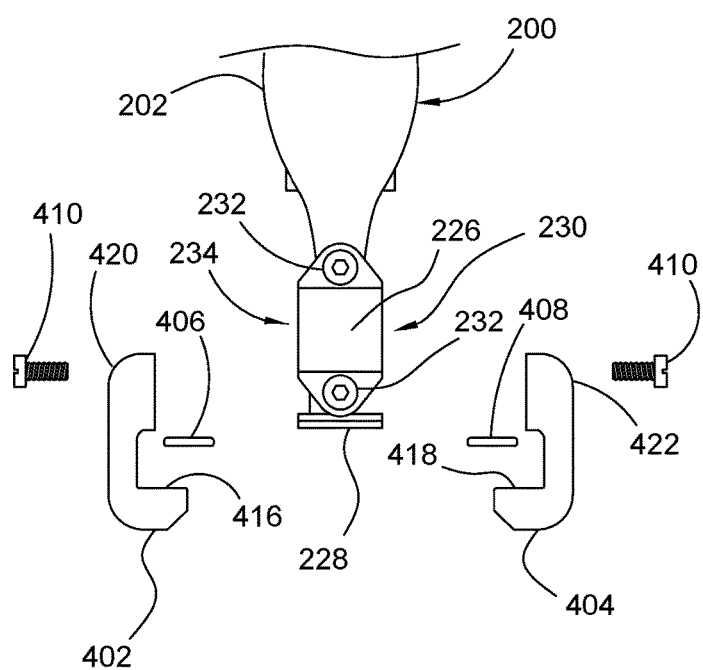
FIGS. 4A-4D show a series of views for assembly of slide rails being assembled onto a piston connecting frame member, in accordance with some embodiments.
Figure 4B:
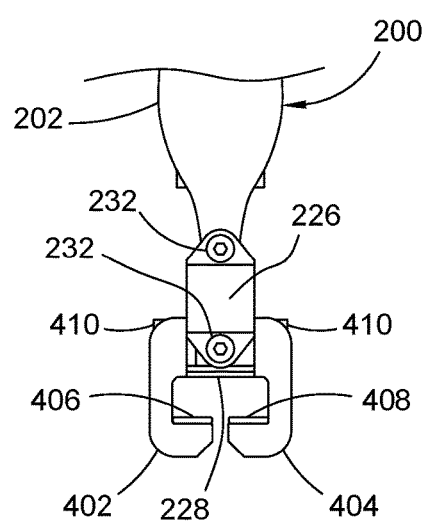
Figure 4C:
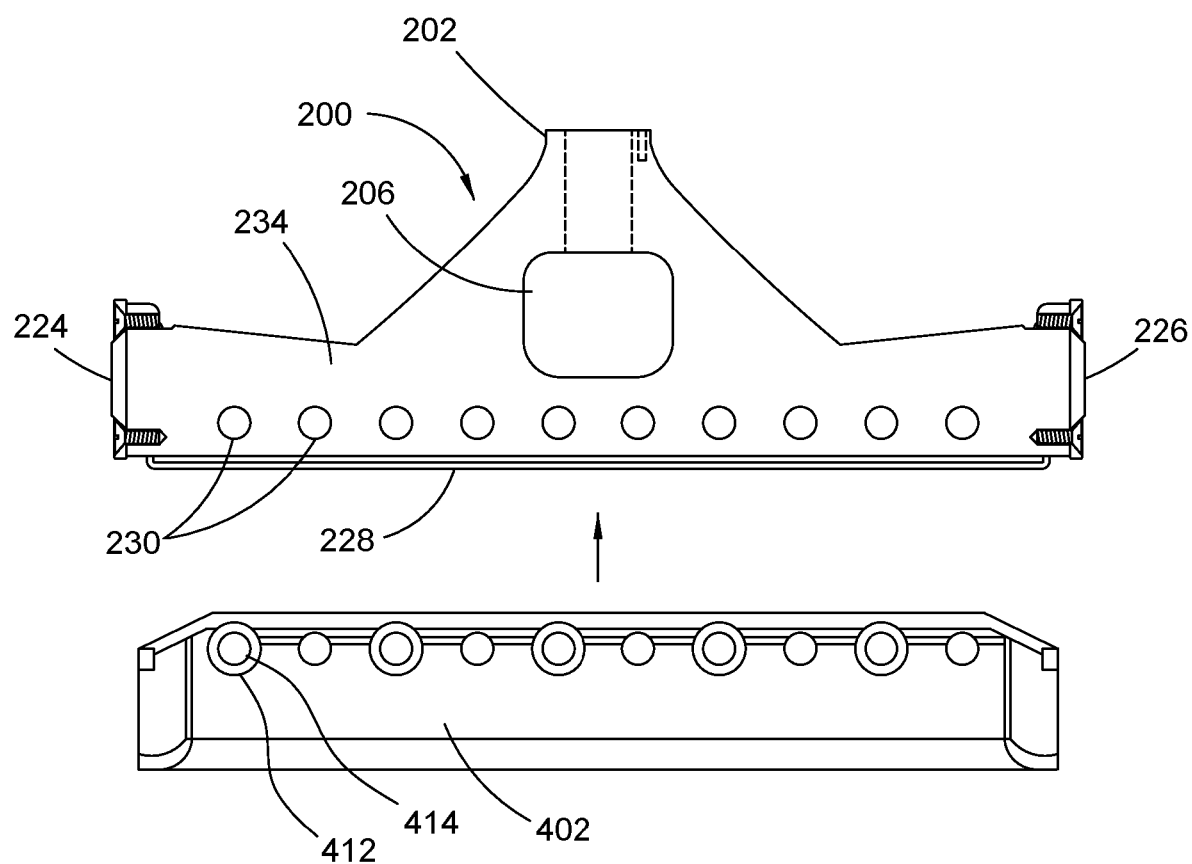
Figure 4D:
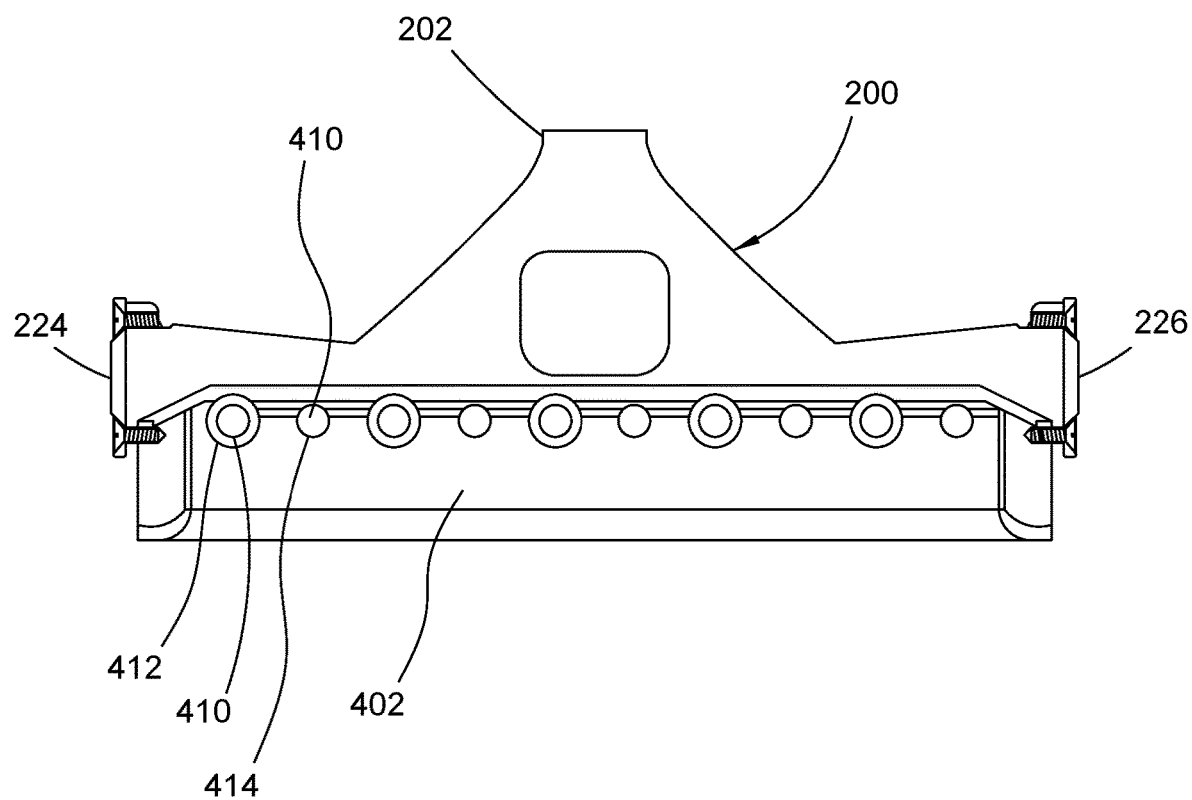
Figure 5A:
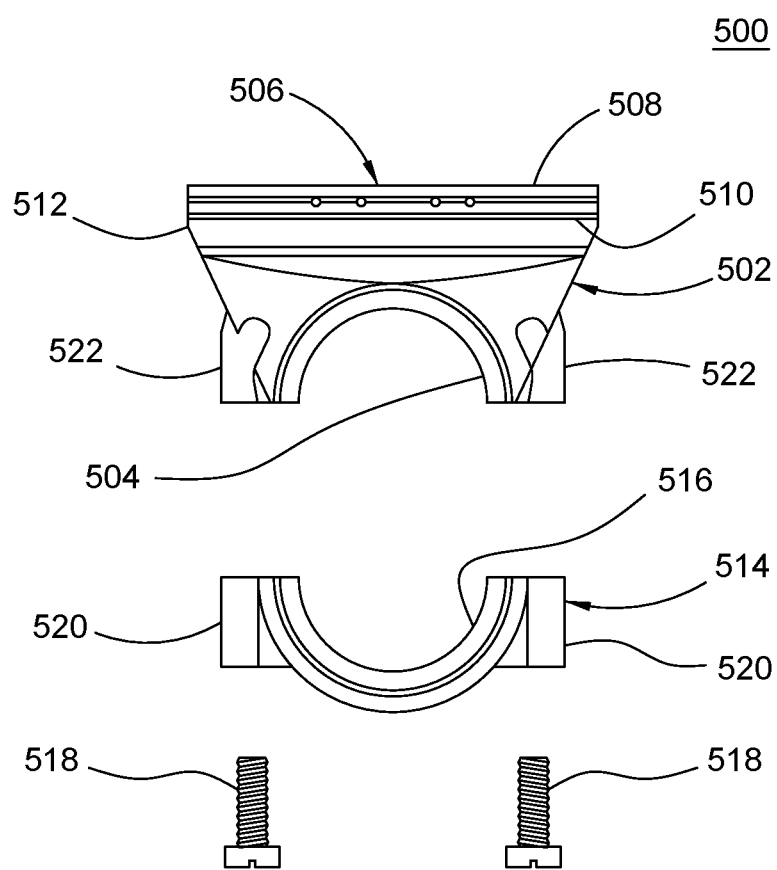

FIGS. 4A-4D show a series of views for assembly of slide rails being assembled onto a piston connecting frame member, in accordance with some embodiments. FIGS. 4A and 4B show an end view of a piston connecting frame member 200 looking at the end having vertical linear bearing 226 in which vertical side extensions 402, 404 are being attached. FIG. 4A shows the exploded view and FIG. 4B shows the assembled view. FIGS. 4C and 4D show a similar series but from the side view as shown in FIGS. 2A-2B. In FIG. 4C a vertical extension 402 is shown separated from the piston connecting frame member 200, and in FIG. 4D the vertical side extension 402 is shown assembled onto the piston connecting frame member 200.

As can be seen in FIGS. 4A-4B, looking at the end of the piston connecting frame member 200, it can be seen that the top boss 202 is round or cylindrical at the top portion of the top boss 202, which matches the cylindrical shape of the connecting boss 108 of the piston 100. The top boss 202 then flattens/narrows farther down the piston connecting frame member 200, and below the port 206 the piston connecting frame member 200 is generally flat along the bottom of the piston connecting frame member 200 from end to end (e.g., from end face 218 to end face 220) in the vertical direction. On each side 234, 236 of the piston connecting frame member 200, along the bottom, and vertical side extension 402, 404 is respectively attached. Each of the vertical side extension 402, 404 are "L" or "J" shaped, having a vertical portion that extends downward along the side 234, 236 of the piston connecting frame member 200, and has a lower horizontal portion that turns inward to extend under the bottom 222 of the piston connecting frame member 200 and under the bottom linear bearing 228, leaving a gap between the horizontal portions of the two vertical side extensions 402, 404. On the top 416, 418 of each horizontal portion of the vertical side extensions 402, 404 is a linear bearing 406, 408 that each have a length equal to bottom linear bearing 228 on the bottom 222 of the piston connecting frame member 200. The linear bearings 406, 408 are positioned by the vertical side extensions 402, 404 so as to be spaced apart from the bottom linear bearing 228, leaving a gap between the bottom linear bearing 228 and the linear bearing 406, 408.

The vertical side extensions 402, 404 each have a plurality of holes 414 along their horizontal length that correspond with the holes 230 near the bottom of the piston connecting frame member 200. Alternating along the holes 414, every other hole 414 has an enlarged recess 412. Bolts 410 pass through the holes 414 on each vertical side extension 402, 404, and through holes 230 in the piston connecting frame member 200, to hold the vertical side extension 402, 404 to the piston connecting frame member 200. The heads of the bolts 410 fit into the recesses 412. In some embodiments rivets can be used in place of the bolts 410. Once the vertical side extension 402, 404 are connected to the sides of the piston connecting frame member 200, the crank connecting member 500 can be attached to the assembled piston connecting frame member 200. Thus, the vertical side extensions 402, 404 server to form a lateral gap along the bottom of the piston connecting frame member, and further to provide support for linear bearings along the bottom of that gap. The gap is used to capture the lateral rail 506 of the upper portion 502 of the crank connecting member 500 and allow lateral rail 506 to reciprocate within the gap in the linear bearings 228, 406, 408.

FIGS. 5A-5D show views of the crank connecting member 500, in accordance with some embodiments. The crank connecting member 500 connects the piston connecting frame member 200 to a throw of the crankshaft, and translates the rotational motion of the crank throw to a strictly vertical motion of the piston connecting frame member 200 and piston 100 by reciprocating laterally on the linear bearings 228, 406, 408. The crank connecting member 500 is comprised of an upper portion 502 and a lower portion 514 which each have a semicircular journal bearing 504, 516, respectively, that are sized to interface with half of the bearing surface of the circular crank throw journal. The upper and lower portions 502, 514 can be joined together by bolts 518 that extend vertically through the opposing ends 520, 522 of the lower and upper portions 514, 502, with the circular journal opening formed by the semicircular journals 504, 516 between the ends 520, 522 where the bolts 518 pass.

Figure 7:
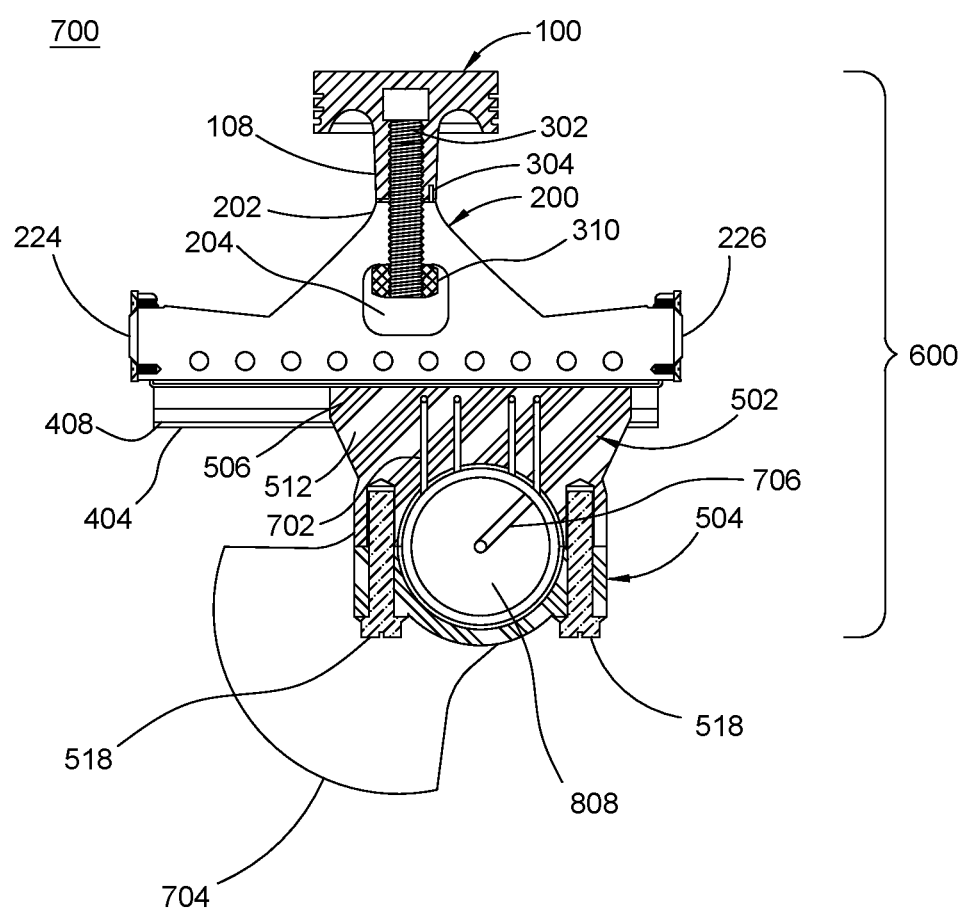
FIG. 7 shows a side cut-away view of a piston assembly connected to a crankshaft, in accordance with some embodiments.

At the top of upper portion 502 is a lateral rail 506 that extends laterally from end to end, and has a flat top surface 508, and flat bottom surfaces 510 on each side of a vertical support section 512. The vertical support section 512 is narrower than a width of the lateral rail 506, and the length of the lateral rail 506 can be longer than the diameter of the circular journal opening formed by the semicircular journals 504, 516. The length of the lateral rail 506 is oriented in a direction that is normal to the axis of the journal opening, and the crank throw, and the width of the lateral rail 506 is in the direction of the journal opening (i.e., normal to the length). Furthermore, an oil groove 524 can be formed in the semicircular journals 504, 516 which encircles the journal opening and is connected to oil passages 526, 528, 530 on the lateral rail 506. One or more oil channels 702 (as shown in FIG. 7) can be formed through the upper portion 502, and through the support section 512 that joins to passages 526, 528, 530. Oil, under pressure, passes through the crankshaft and the crank throw, as is conventional, into the oil groove 524, and the pressure forces oil from the oil groove 524 into the channel(s) and out of passages 526, 528, 530. Passages 526 provide oil to the top of the lateral rail 506, passages 528 provide oil at the ends of the lateral rail 506 (and are provided on both ends of the lateral rail 506), and passages 530 are provided on both sides of the lateral rail 506 to provide oil on the sides of the lateral rail 506 which lubricates the linear bearings 406, 408. The lateral rail 506 is assembled into the gap at the bottom of the piston connecting frame member 200, between linear bearing 228 and linear bearings 406, 408, and reciprocates laterally along that gap as the crank throw in journal opening turns circularly around the crankshaft and within the journal opening on journal bearings 504, 516.

Figure 6:
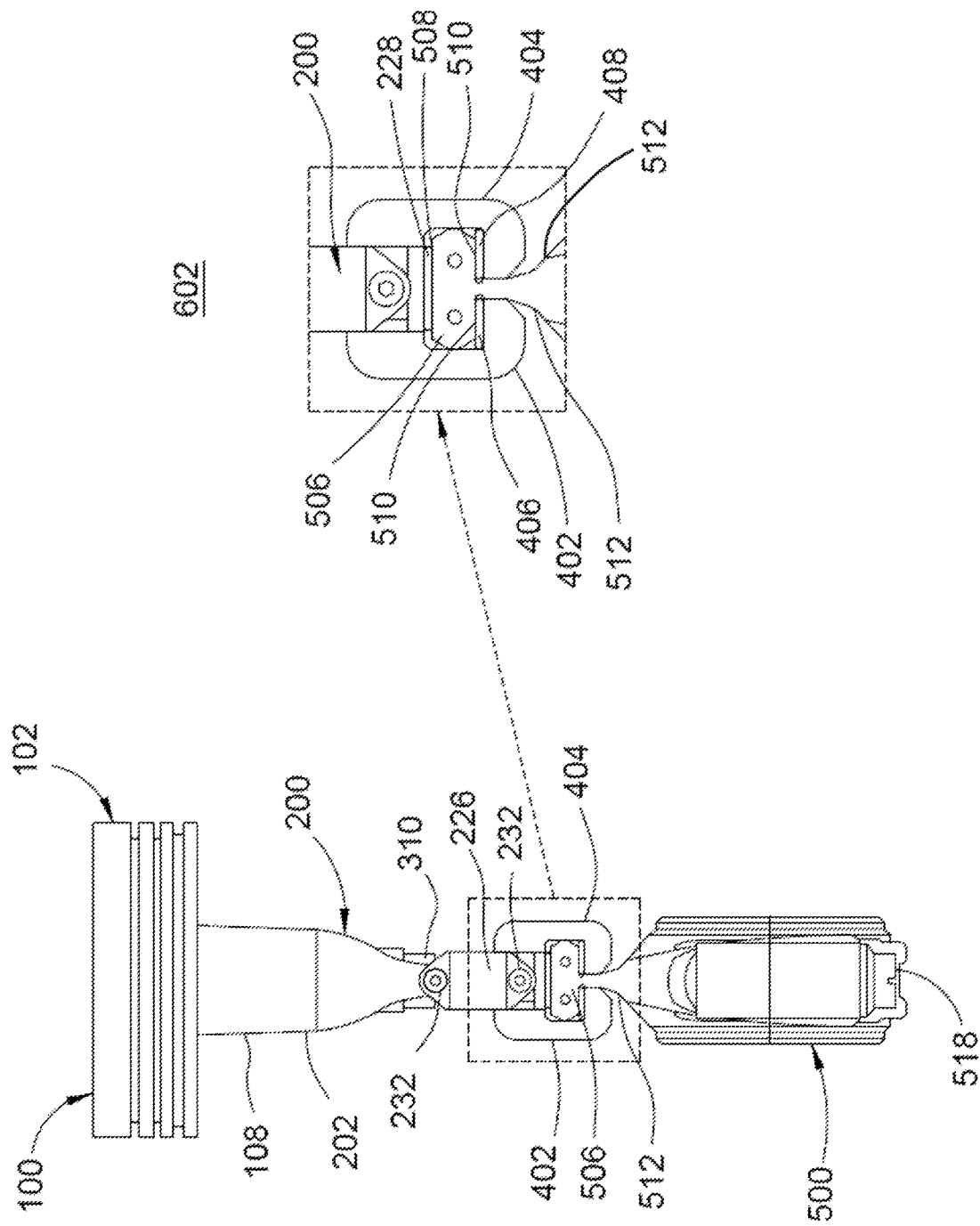
FIG. 6 shows a crank connecting member assembled to a piston connecting frame member, in accordance with some embodiments.

FIG. 6 shows an end view piston assembly 600 including a crank connecting member 500 assembled to a piston connecting frame member 200, which is connection to a piston 100, in accordance with some embodiments. A detail view 602 shows the lateral rail 506 of the crank connecting member 500 positioned in the gap between linear bearing 228 and linear bearings 406, 408. FIG. 7 shows a side cut-away view of a piston assembly 700 as otherwise assembled as shown in FIG. 6, and including the elements shown in the exploded view of FIG. 3.

The lateral rail 506 slides laterally in the gap, against the linear bearing 228 on the upstroke, and against linear bearings 406, 408 on the downstroke, as the crank connecting member 500 moves with the crank throw 808, with the vertical support section 512 reciprocating between the vertical downward extensions 402, 404. Oil can be pumped through the crankshaft and crank throw through oil passage 706 in the crank throw into groove 528 of the crank journals 504, 516, and through one or more channels or passages 702 in the upper portion 502 of the crank connecting member 500. From the oil passages 702 the oil is distributed to passages 526, 528, 530 and oil exiting these passages lubricate the linear bearings 228, 406, 408. It will be understood by those skilled in the art that the term "passage" as used here refers to a void of material that allows oil to pass through the structure. The passages are generally internal to a structure, with openings on different sides of or other parts of the structure so that oil under pressure can be fed into one opening, through the passage, and out the opening at the other end(s) of the passage. One of the crank counterweights 704 is also shown in FIG. 7. As the crank throw 808 revolves around the axis of the crank shaft, the crank connecting member likewise moves in a circular path, therefore having both vertical and horizontal motion. Accordingly, as the piston connecting frame member 200 is constrained by the vertical linear bearings 224, 226 bearing against vertical tracks or guides in the crank case, the piston connecting frame member 200 can only move vertically, up and down. The lateral rail 506 both pushes the piston connecting frame member 200 up, and pulls it down, as it slides laterally relative to the piston connecting frame member 200, as captured between the bottom linear bearing 228, and the linear bearings 406, 408.

FIGS. 8A-8D show a series of stroke positions of a piston assembly in an internal combustion engine, in accordance with some embodiments. In all of FIGS. 8A-8D, there is shown a piston assembly (e.g., 600) in an internal combustion engine having a head 802 and a crankcase 804. The piston 100 reciprocates vertically in a cylinder bore 806 in the head, along the axis of the cylinder bore. Valves for intake and exhaust (not shown) can be provided at the top of the head in a conventional manner.

Figure 8A:
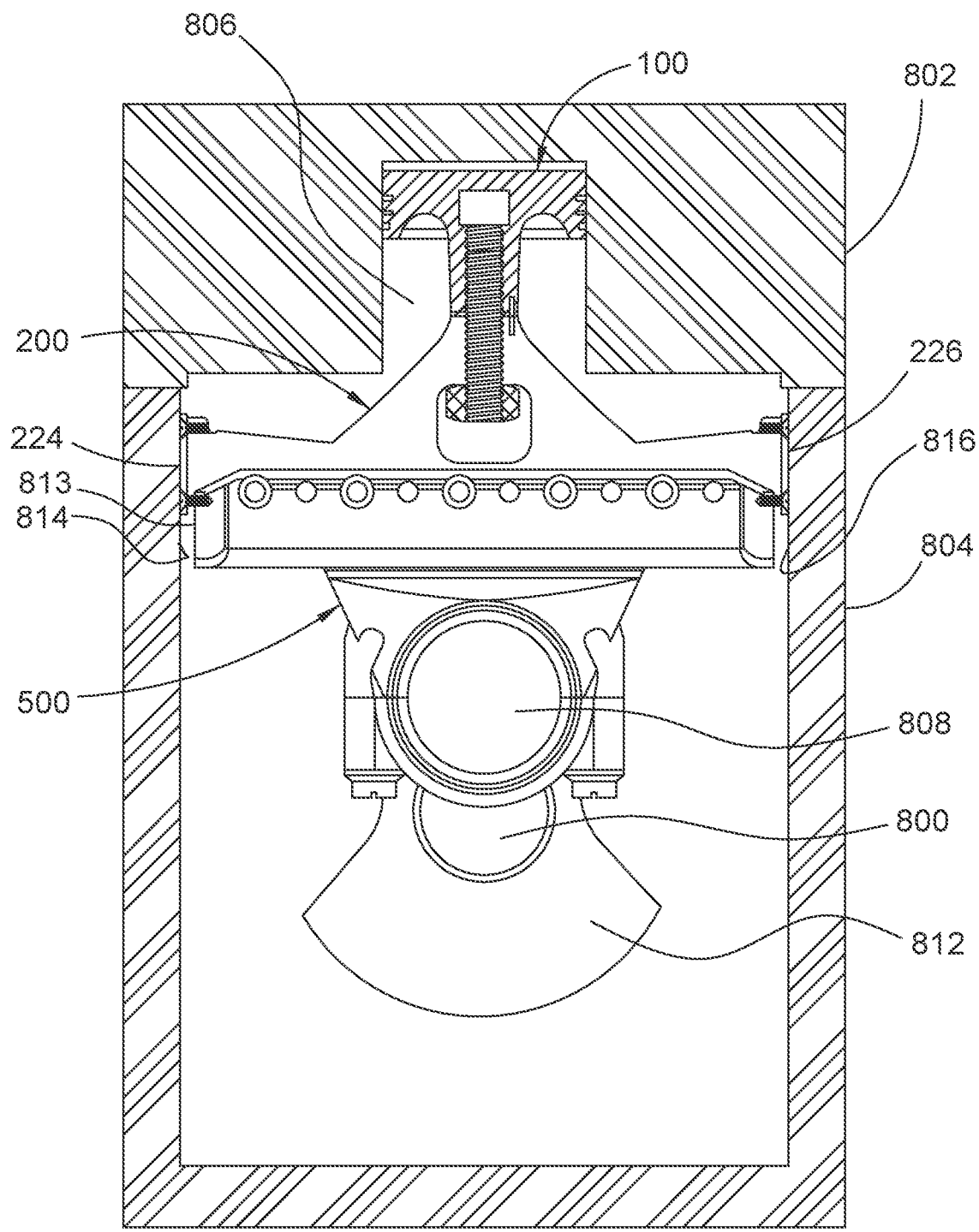
FIGS. 8A-8D show a series of stroke positions of a piston assembly in an internal combustion engine, in accordance with some embodiments.

In FIG. 8A the piston 100 is shown at the top of its stroke ("top dead center"). The crank throw 808 is elevated higher than the crank bearing 810 which is on the crank axis about which the crankshaft revolves. The crank throw counterweight 812 is at the bottom of its path. The vertical linear bearings 224, 226 on the opposing ends of the piston connecting frame member 200 slide vertically (up and down) in respective tracks 814, 816 in the vertical wall of the crankcase.

Figure 8B:
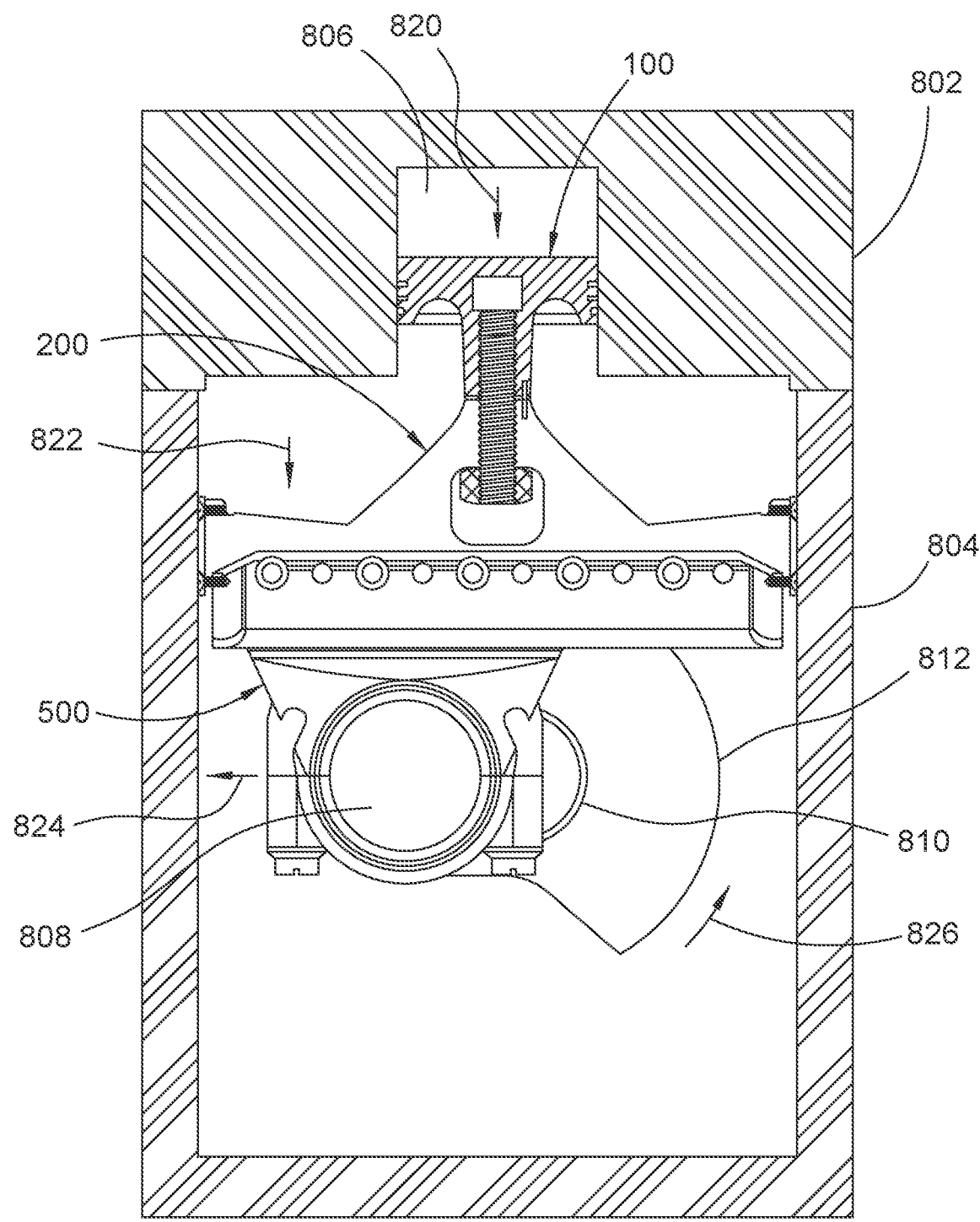

In FIG. 8B the piston have moved downward, as indicated by arrow 820, as would happen on either an intake stroke or a combustion stroke. The position shown could be at ninety degrees of a stroke crankshaft revolution. Likewise, the piston connecting frame member 200 has moved downward as indicated by arrow 822. As a result, the crank connecting member 500 has move downward, but also to the side, as indicated by arrow 824. The lateral rail 506 will bear against the bottom linear bearing 228 on a combustion downstroke, and against linear bearings 406, 408 on an intake downstroke. The counterweight 812 has also rotated a quarter of a revolution as indicated by arrow 826.

Figure 8C:
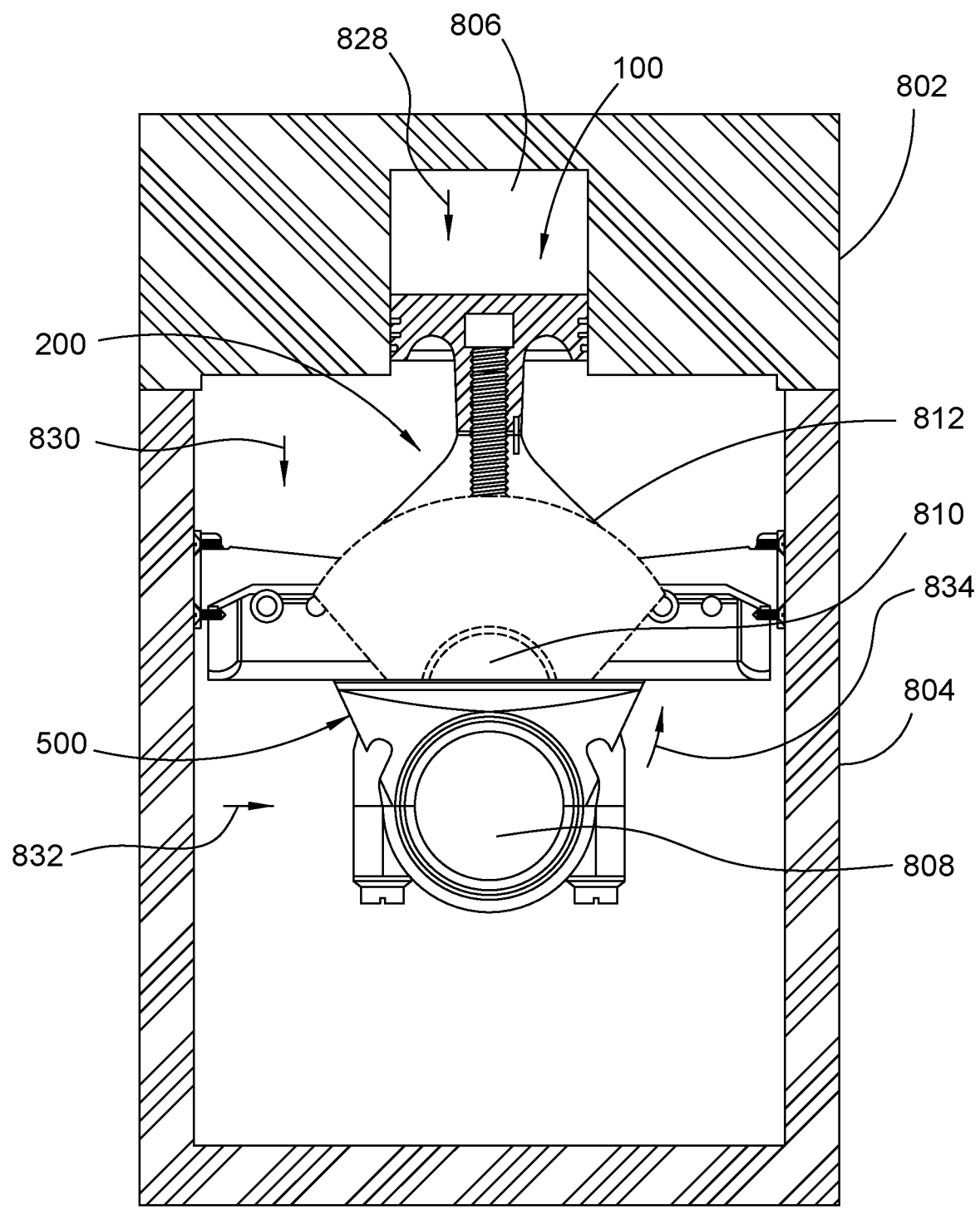

In FIG. 8C the piston assembly is at the bottom of the stroke cycle, or one hundred eighty degrees of the stroke cycle, therefore the piston 100, and piston connecting frame member 200 are at the lowest point in the stroke cycle, and have moved farther downward from that of FIG. 8B, as indicated by arrows 828, 830, respectively. The crank connecting member 500 is also at the bottom of its rotation about the crank bearing 810 but has moved laterally in the opposite direction from that of FIG. 8B, as indicated by arrow 832, and the counterweight 812 is at the top of its rotation as indicated by arrow 834.

Figure 8D:
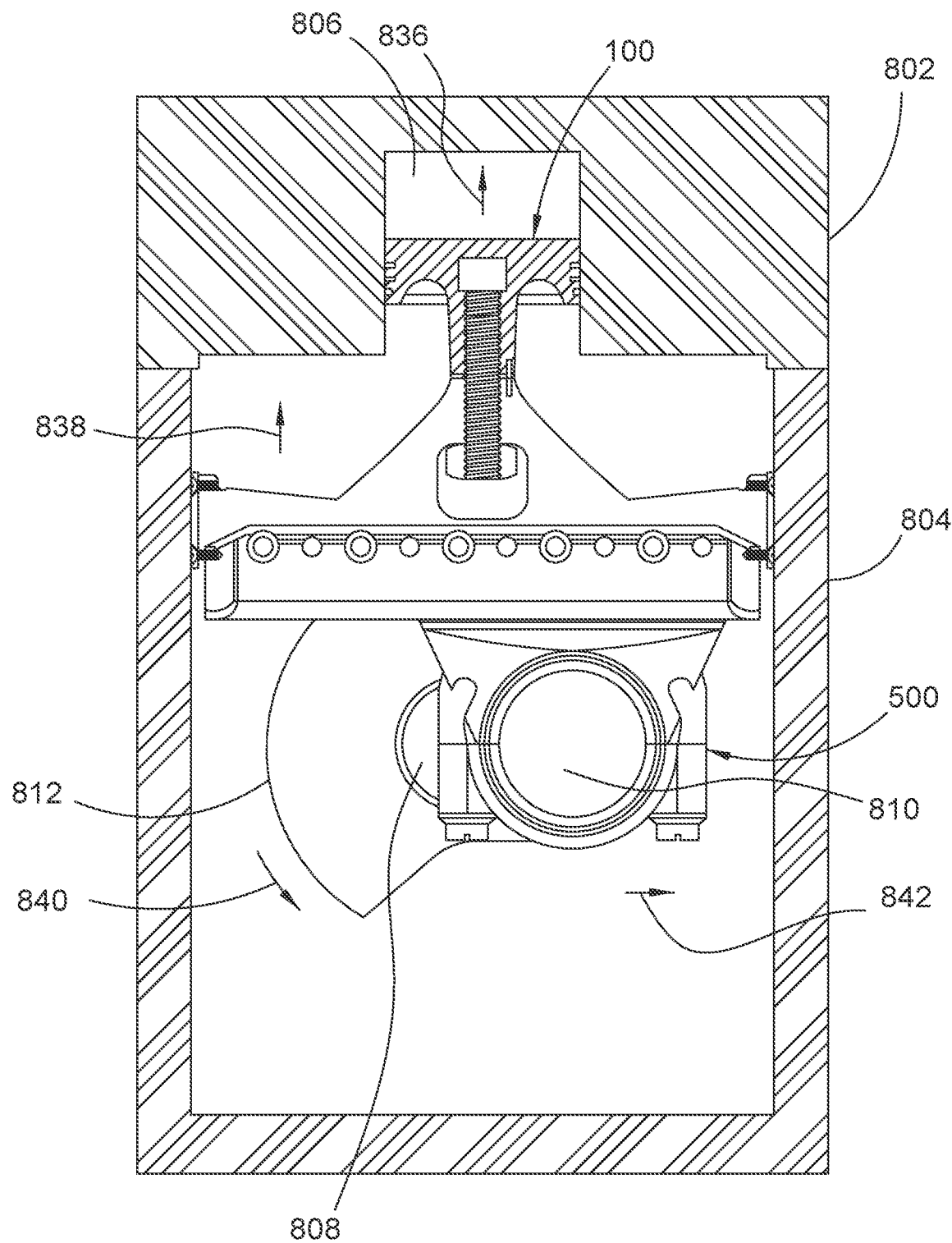

In FIG. 8D the piston 100 and piston connecting frame member 200 are on the upstroke, as indicated, respectively, by arrows 836, 838, either compressing fuel prior to combustion or pushing burnt fuel vapors out of the exhaust port (not shown) in the head 802. This position is about two hundred seventy degrees of a crank rotation. the crank connecting member 500 is now at the extreme right side of its movement relative to the piston connecting frame member 200 as indicated by arrow 842, and the counterweight 812 in in a downward portion of its rotation as indicated by arrow 840.

After FIG. 8D the cycle repeats for a second half of the process. As can be seen, while the piston 100 and piston connecting frame member 200 travel exclusively in the vertical direction, the crank connecting member 500 slides laterally with respect to the piston connecting frame member 200, but also rotationally around the crank bearing 810. The motion of the piston 100 and piston connecting frame member 200 are both purely vertical, and follow a sinusoidal reciprocation, slowing equally at the top and bottom, and having their fastest travel at mid-stroke. The crank connecting member 500 follows a perfectly circular motion is it travels around the axis of the crank shaft on the crank throw 808, and imparts motion to the piston connecting frame member 200 and piston by exerting force on the linear bearings 228, 406, 408 at alternating times of the stroke cycle. Thus, there are no secondary forces resulting from a velocity differential at the lower end of the connecting rod, as in a conventional piston assembly.

Figure 9:
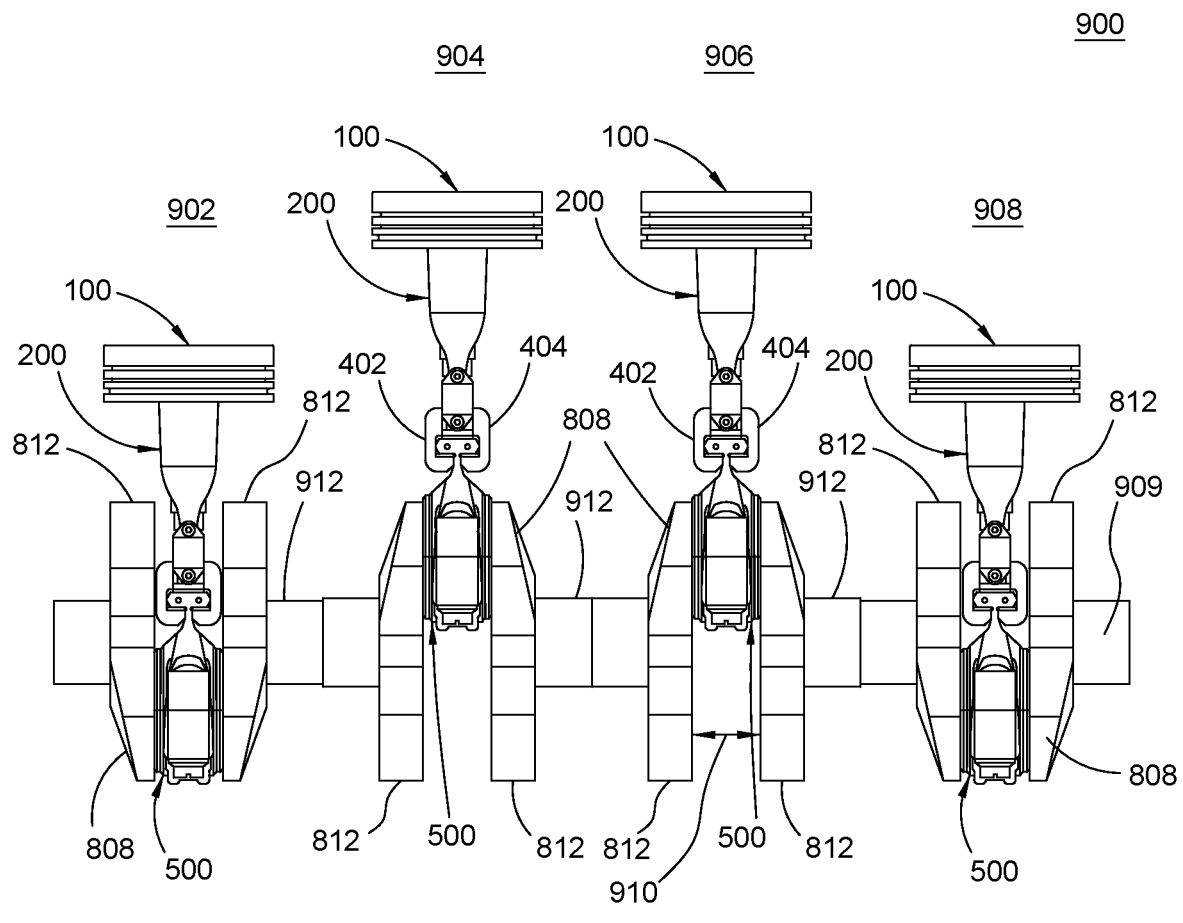
FIG. 9 shows a side view of a four piston assemblies connected to a crankshaft for an inline four cylinder engine, in accordance with some embodiments.

FIG. 9 shows a side view 900 of four piston assemblies 902, 904, 906, 908 connected to a crankshaft 909 for an inline four-cylinder (I4) engine, in accordance with some embodiments. The head and crankcase have been removed, but the piston assemblies 902-908 are otherwise each as shown in FIGS. 8A-8D, and each have a piston 100, a piston connecting frame member 200, a crank connecting member 500. The center two piston assemblies 904, 906 are one hundred eighty degrees out of phase with the outer two piston assemblies 902, 908 to balance forces exerted on the crankshaft 909. Since the inventive 14 engine does not experience the secondary forces that are present in a conventional 14 engine using connecting rods to connect the crank throw directly to the piston, the inventive 14 engine disclosed here can achieve engine speeds (revolutions per minute) and high-power output over the a conventional 14 engine of the same displacement and general configuration (e.g. valve size and number, compression ratio, etc.). Each piston assembly is separated from adjacent piston assembly/assemblies by a main bearing crankshaft journal 912. Each piston assembly 902-908 is connected to a respective crank throw 808 that passes through the crack connecting member 500 of each piston assembly 902-908. The crank throws 808 are joined with counterweights 812 that extend across the opposite side of the axis of the crankshaft from the crank throws 808, and as the crank throw 808 and counterweights 812 rotate about the axis of the crankshaft, the crank connecting member 500 will pass between the counterweights 812 as shown in piston assemblies 902, 908.

A cylinder unit and engine using the cylinder unit has been disclosed that eliminates the secondary forces that occur in conventional inline four-cylinder engines by use of a piston connecting frame member that reciprocates exclusively in a direction parallel to that of the piston. A crank connecting member connects the piston connecting member to the crank throw and translates the circular motion of the crank throw to a linear motion of the piston and piston connecting frame member. The crankcase walls are used to stabilize the piston connecting frame member and constrain the motion of the piston connecting frame member along the direction of the axis of the cylinder bore. The crank connecting member, as it is moved circularly by the crank throw, reciprocates laterally with respect to the piston connecting frame member, as it reciprocates vertically.

The claims appended hereto are meant to cover all modifications and changes within the scope and spirit of the present invention.

What is claimed is:

1. An internal combustion engine, comprising:
   a plurality of in-line cylinder units;
   each one of the cylinder units having:
   a bore having a bore axis;
   a piston disposed in the bore that reciprocates within the bore along the bore axis, the piston having a head and a connecting boss extending from a bottom of the head;
   a piston connecting frame member having a top boss that is centrally located on the piston connecting frame member and that is coupled to the connecting boss of the piston, the piston connecting frame member further having a pair of lateral portions extending outward in opposing directions, each lateral portion having a vertical end face with a respective vertical linear bearing mounted on the vertical end face, the piston connecting frame member further having a bottom on which a bottom linear bearing is mounted; and
   a crank connecting member having a lateral rail at a top of the crank connecting member, wherein the lateral rail is captured at a bottom of the piston connecting frame member and reciprocates laterally along the bottom of the piston connecting frame member, the crank connecting member further having a crank throw opening to connect to a throw of a crankshaft, wherein the crank connecting member includes an oil groove formed in a crank journal, and further includes at least one oil passage to the lateral rail, and wherein the at least one oil passage to the lateral rail is open at the lateral rail.

2. The internal combustion engine of claim 1, wherein the piston of each cylinder unit is a skirtless piston.

3. The internal combustion engine of claim 1, wherein the piston connecting frame member includes a pair of vertical side extensions, each one of the vertical side extensions mounted on a respective one of opposing sides of the piston connecting frame member, and having a lower portion that extends inward, under the bottom linear bearing, and wherein the lower portion of each vertical side extension include a linear bearing under the bottom linear bearing on the bottom of the piston connecting frame member, wherein the lateral rail of the crank connecting member is captured between the bottom linear bearing and the linear bearings on each of the vertical side extensions.

4. The internal combustion engine of claim 1, wherein the lateral rail comprises oil passages that are open at a top, sides, and ends of the lateral rail.

5. The internal combustion engine of claim 1, wherein the connecting boss of the piston includes a threaded bore, the top boss of the piston connecting frame member includes a bore that corresponds to the bore in the connecting boss, the piston connecting frame member further having a port through the piston connecting frame member to which the bore in the top boss extends, a threaded rod is disposed in the bore of the connecting boss through the top boss such that free end of the threaded rod is in the port, and a nut is threaded onto the free end to retain the piston to the piston connecting frame member.

6. The internal combustion engine of claim 5, further comprising an anti-rotation pin that extends from the top boss into a bottom of the connecting boss that prevents the piston from rotating with respect to the piston connecting frame member.

7. An inline four-cylinder engine, comprising:
   four piston assemblies arranged in a line and each connected to a crankshaft, each one of the piston assemblies including:
   a piston having a head and a connecting boss extending from a bottom of the head;
   a piston connecting frame member having a top boss that is centrally located on the piston connecting frame member and that is coupled to the connecting boss of the piston, the piston connecting frame member further having a pair of lateral portions extending outward in opposing directions, each lateral portion having a vertical end face with a respective vertical linear bearing mounted on the vertical end face, the piston connecting frame member further having a bottom on which a bottom linear bearing is mounted;
   wherein the piston connecting frame member includes a pair of vertical side extensions, each one of the vertical side extensions mounted on a respective one of opposing sides of the piston connecting frame member, and having a lower portion that extends inward, under the bottom linear bearing, and wherein the lower portion of each vertical side extension include a linear bearing under the bottom linear bearing on the bottom of the piston connecting frame member, wherein the lateral rail of the crank connecting member is captured between the bottom linear bearing and the linear bearings on each of the vertical side extensions; and
   a crank connecting member having a lateral rail at a top of the crank connecting member, and a journal opening configured to receive a crank throw of the crankshaft therein, wherein the lateral rail is captured at the bottom of the piston connecting frame member and reciprocates laterally along the bottom of the piston connecting frame member.

8. The inline four-cylinder engine of claim 7, wherein the piston of each cylinder unit is a skirtless piston.

9. The inline four-cylinder engine of claim 7, wherein the crank connecting member includes an oil groove formed in a crank journal, and further includes at least one oil passage to the lateral rail, and wherein the at least one oil passage to the lateral rail is open at the lateral rail.

10. The inline four-cylinder engine of claim 9, wherein the lateral rail comprises oil passages that are open at a top, sides, and ends of the lateral rail.

11. The inline four-cylinder engine of claim 7, wherein the connecting boss of the piston includes a threaded bore, the top boss of the piston connecting frame member includes a bore that corresponds to the bore in the connecting boss, the piston connecting frame member further having a port through the piston connecting frame member to which the bore in the top boss extends, a threaded rod is disposed in the bore of the connecting boss through the top boss such that free end of the threaded rod is in the port, and a nut is threaded onto the free end to retain the piston to the piston connecting frame member.

12. The inline four-cylinder engine of claim 11, further comprising an anti-rotation pin that extends from the top boss into a bottom of the connecting boss that prevents the piston from rotating with respect to the piston connecting frame member.

13. A cylinder unit for an internal combustion engine, comprising:
   a cylinder having a bore, the bore having a bore axis;
   a piston disposed in the bore and having a connecting boss;
   a piston connecting frame member connected to the piston and having a top boss, the piston connecting frame member having lateral portions extending in opposite directions and generally in a direction normal to the bore axis, each of the lateral portions having a vertical linear bearing that each face outward from the respective lateral portions and are each oriented to have an outer face that is parallel to the bore axis, a transverse gap formed at a bottom of the piston connecting frame member;
   wherein the connecting boss of the piston includes a threaded bore, the top boss of the piston connecting frame member includes a bore that corresponds to the bore in the connecting boss, the piston connecting frame member further having a port through the piston connecting frame member to which the bore in the top boss extends, a threaded rod is disposed in the bore of the connecting boss the bore through the top boss such that free end of the threaded rod is in the port, and a nut is threaded onto the free end to retain the piston to the piston connecting frame member;
   a crankcase having vertical tracks on opposite sides of an interior of the crankcase, wherein the vertical linear bearings are each engaged in one of the vertical tracks; and
   a crank connecting member having a top portion, a linear rail formed at the top portion that is captured in the transverse gap, the crank connecting member further having a journal opening configured to receive a crank throw therein;
   wherein the crank connecting member translates a circular movement of the crank throw to a vertical linear movement of the piston connecting frame member and piston along the bore axis.

* * * * *